April 13, 1965   D. COHEN   3,177,826
PORTABLE CHARCOAL LIGHTER
Filed May 27, 1963
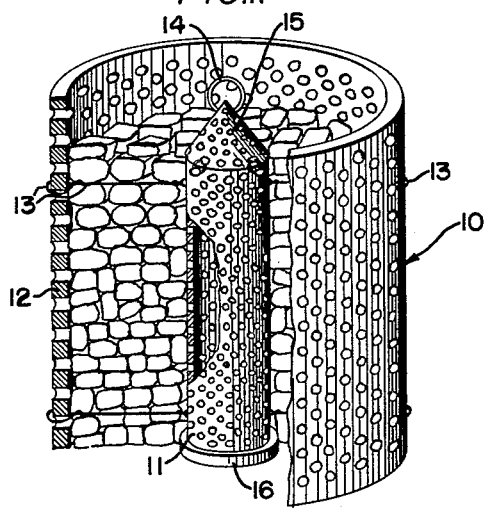
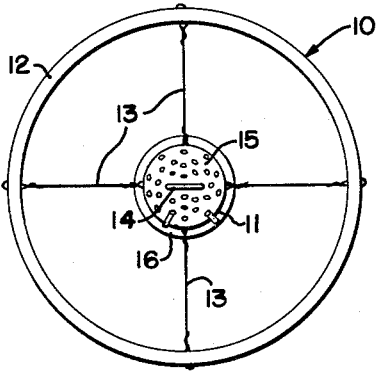
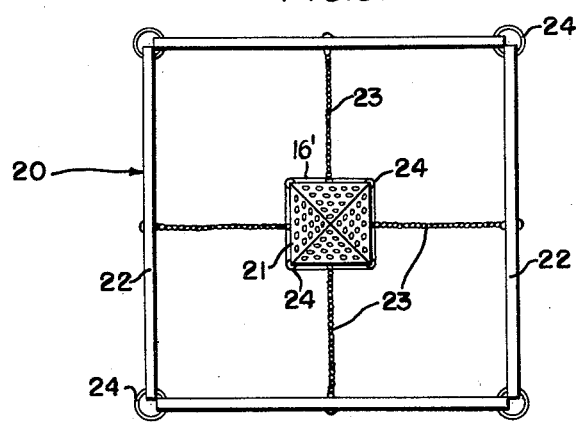
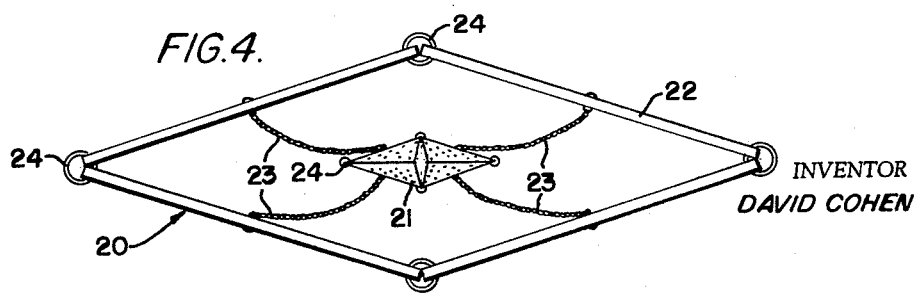
INVENTOR
DAVID COHEN 3,177,826
PORTABLE CHARCOAL LIGHTER
David Cohen, 2315 Creston Ave., New York, N.Y.
Filed May 27, 1963, Ser. No. 283,249
5 Claims. (Cl. 110—1)

This invention relates to a portable apparatus for lighting charcoal and more specifically to a device that is capable of lighting charcoal rapidly and quickly unloading them into a grill, cook stove, brazier, barbecue and the like.

Grills and the like have gained great popularity for outside and inside cooking in recent years. The fuel used in these cooking devices is charcoal. Those acquainted with the use of charcoal are well aware of the time and difficulty required to start it burning. It is not only desirable to quickly start charcoal burning but to have all the charcoal burning to enable full utilization of the entire cooking grill surface and not merely a small portion of it. Various means have been tried with varying degrees of success. Paper, kindling wood, lighting fluids and other highly combustible materials, used beneath, over or adjacent to the charcoal, burn quickly without sufficiently igniting the charcoal. At best only a small percentage of the charcoal is ignited requiring repetition of the igniting process. Electrical means have in recent years been used to ignite charcoal but this process requires electrical current thereby limiting its use to the immediate vicinity of an electrical outlet or requiring long electrical extension cords.

An object of the present invention is to provide a portable apparatus which is capable of quickly lighting charcoal without any of the difficulties noted above with known prior art practices.

Another object of the invention is to provide a charcoal lighting apparatus which is portable and if desired, collapsible.

A further object of this invention is to provide a charcoal lighting apparatus which is easy to use, simple in construction, light in weight, attractive, economical to manufacture and requires no maintenance.

Still another object is to provide a charcoal lighting apparatus wherein the charcoal to be ignited is confined in a relatively small space so that all the charcoal may be evenly ignited.

Yet another object of the present invention is to provide a charcoal lighting apparatus which works on the principle of a chimney in that its design results in the utilization of a natural draft.

A still further object is to provide a charcoal lighting apparatus which will not require electricity and which can be used with all types of indoor and outdoor types of cooking devices that use charcoal or other similar fuel.

Other objects and many of the attendant advantages of this invention will be readily appreciated as the same becomes better understood by reference to the following detailed description when considered in connection with the accompanying drawing in which:

FIGURE 1 is a broken, side elevation view of a preferred embodiment of the invention.

FIGURE 2 is a top plan view of the apparatus.

FIGURE 3 is a top plan view illustrating a modification of the apparatus.

FIGURE 4 illustrates the modification of the apparatus in a partly collapsed position.

Referring now to the drawings, more specifically, reference number 10 designates in general a portable charcoal lighter consisting of an inner cylinder 11 constructed of thin gage perforated fire resistant material, held circular by means of staples or rings placed through the perforated holes, the upper end of which is permanently closed by a cone-shaped member 15 made from the same gage perforated material with a base diameter equal in dimension to the inner cylinder diameter and held together and to the inner cylinder by staples or rings, and the lower end of the inner cylinder closed by a removable fire resistant base or cap 16 which is held to the inner cylinder by means of a press fit, threaded connection or the like.

The inner cylinder 11 is held concentrically within the outer cylinder or housing 12 by a plurality of fire resistant thin cross section rods 13 which are held to the inner cylinder and housing by looping the ends through the perforated holes of the inner cylinder and housing, the housing being open at both ends is made of thin gage perforated fire resistant material and is held circular by means of staples or rings through the perforated holes. A ring 14, made from fire resistant material, used to carry or handle the charcoal lighter, is attached to the point of the inner cylinder cone 15 by looping it through the holes of the perforated material.

In the preferred form of the invention shown in FIGURES 1 and 2, the tubular members 11 and 12 are cylindrical in cross-section.

For those who prefer a collapsible charcoal lighter, the tubular members may be formed in square or rectangular cross-section as shown at 20 (FIGURES 3 and 4). The inner container 21 and outer container or housing 22 are made of the same thin gage perforated material as is the circular charcoal starter 10, the inner container being permanently secured on the upper end by a cone shaped member held together and to the upper end of the inner container by rings 24 which act as hinges thereby permitting the assembly to collapse, and closed on the lower end by a removable cap or base which is held to the lower end of the inner container by means of a press fit or the like.

The inner container 21 is held equidistant within the outer container or housing 22 by means of plurality of thin cross section fire resistant chains located in the middle of each side of the containers and secured to the inner container 21 and the housing 22 by fire resistant rings which are looped through the perforated holes of the inner container 21 and housing 22. The respective sides of the inner container 21 and housing 22 are held together by a plurality of rings 24, which act as hinges thereby permitting the assembly to collapse when not in use.

The invention is operated by removing the base cap 16 from the inner cylinder 11 and placing charcoal starter fluid or other combustible liquid fuel in it. The base cap 16 is then pressed or screwed on to the bottom end of the inner cylinder 11, the charcoal starter 10 placed on any conventional grill pit, charcoal or the like placed between the inner cylinder 11 and the housing 12 and starter fluid or other combustible liquid fuel applied to the charcoal.

The liquid fuel or the charcoal is then ignited by applying a match or lighter to it and the natural draft effect of the inner cylinder 11 affords a fast and even lighting of the charcoal. After the charcoal has become ignited, the flame gradually dies down and in turn ignites the liquid fuel in base cap 16.

The reserve liquid fuel in the base cap 16 is sufficient to maintain a fire through the inner cylinder 11 for a period of 7 to 10 minutes after which time the charcoal between the inner cylinder 11 and the housing 12 will be evenly ignited and burning and ready to be discharged to the grill pit.

Discharging of the charcoal into the grill pit is performed by placing a stick, twig or rod through the ring 14 and lifting charcoal starter 10 from the grill pit.

It should be understood, of course, that the foregoing disclosure relates to a preferred embodiment of the invention and that numerous modifications or alterations

What is claimed is:

1. A portable charcoal lighter consisting of an inner tubular member made of perforated fire-resistant thin gage material, closure means provided at the upper and lower end portions of said inner tubular member, the upper end closure means being formed in cone-like configuration and being perforated and permanently secured to said inner tubular member by means of fire-resistant rings, the lower end closure means being imperforate and consisting of a removable fire-resistant base member; and an outer tubular member made of perforated fire-resistant thin gage material, open at both ends to permit quick loading and discharge of charcoal contained between said inner and outer tubular members; said inner and outer tubular members being held equidistant with respect to each other by means of a plurality of radially extending supporting elements formed of fire-resistant material hingedly secured to said inner and outer tubular members.

2. The apparatus of claim 1 wherein the inner and outer tubular members are cylindrical in cross-section, and said supporting elements consist of thin cross-section fire-resistant rods secured to said inner and outer tubular members by looping the ends of said rods through perforations in said inner and outer tubular members.

3. The apparatus of claim 1 wherein the inner and outer tubular members are rectangular in cross-section, each of said members consisting of four side walls connected together by means of fire-resistant rings acting as hinges, and said supporting elements consist of fire-resistant chains, said chains being secured to the inner and outer tubular members by fire-resistant rings looped through perforations in said inner and outer tubular members.

4. The apparatus of claim 1 wherein the fire-resistant base member is provided with means for receiving and holding a supply of liquid fuel.

5. The apparatus of claim 1 wherein the upper end closure means of the inner tubular member is provided with a carrying and handling ring, the latter being secured to said closure means by being looped through perforations therein.

References Cited by the Examiner
UNITED STATES PATENTS

| | | | |
|---|---|---|---|
| 1,305,710 | 6/19 | Gibbs | 110—18 |
| 2,172,769 | 9/39 | Luedtke | 126—9 X |
| 2,469,885 | 5/49 | Molla | 126—9 X |
| 3,062,200 | 11/62 | Miller | 126—25 |
| 3,073,263 | 1/63 | Wynkoop | 110—1 |

JAMES W. WESTHAVER, *Primary Examiner.*

FREDERICK KETTERER, *Examiner.*